United States Patent
Diehl et al.

(10) Patent No.: US 9,844,810 B2
(45) Date of Patent: Dec. 19, 2017

(54) PUNCH RIVET AND ALSO A METHOD AND APPARATUSES FOR ATTACHMENT OF INDIVIDUAL COMPONENTS TO ONE ANOTHER OF WHICH AT LEAST ONE COMPONENT IS FORMED BY A WORKPIECE OF COMPOSITE MATERIAL

(71) Applicant: PROFIL Verbindungstechnik GmbH & Co. KG, Friedrichsdorf (DE)

(72) Inventors: Oliver Diehl, Bad Homburg v.d.H. (DE); Richard Humpert, Bad Nauheim (DE); Andreas Lembach, Darmstadt (DE)

(73) Assignee: PROFIL VERBINDUNGSTECHNIK GMBH & CO. KG, Friedrichsdorf (DE)

( * ) Notice: Subject to any disclaimer, the term of this patent is extended or adjusted under 35 U.S.C. 154(b) by 450 days.

(21) Appl. No.: 14/476,369

(22) Filed: Sep. 3, 2014

(65) Prior Publication Data

US 2015/0082607 A1    Mar. 26, 2015

(30) Foreign Application Priority Data

Sep. 4, 2013   (DE) .................. 10 2013 217 632

(51) Int. Cl.
*B21J 15/02* (2006.01)
*F16B 5/04* (2006.01)
(Continued)

(52) U.S. Cl.
CPC ............ *B21J 15/02* (2013.01); *B21J 15/025* (2013.01); *B21J 15/147* (2013.01); *B21J 15/36* (2013.01);
(Continued)

(58) Field of Classification Search
CPC . B21J 15/02; B21J 15/36; B21J 15/147; B21J 15/025; B21J 15/04; B21J 15/041;
(Continued)

(56) References Cited

U.S. PATENT DOCUMENTS 2,248,755 A * 7/1941 Hathorn .............. F16B 19/1045
411/15
3,439,412 A * 4/1969 Jackson ................. B21J 15/041
29/509
(Continued)

FOREIGN PATENT DOCUMENTS

DE    19701088 A1    7/1998
DE    19728736 A1    1/1999
(Continued)

OTHER PUBLICATIONS

Official Communication from Russian Patent Office; dated May 30, 2016; 4 pages.

*Primary Examiner* — Jun Yoo
(74) *Attorney, Agent, or Firm* — Cantor Colburn LLP

(57) ABSTRACT

A hollow punch rivet is described having a flange and a rivet section. Furthermore, a method for the attachment of individual components to one another using a punch rivet is described, with at least one of the components being formed by a material of the composite material. The method includes the following steps:
 a) arrangement of the die button against one of the two components to be secured to one another, which are placed on one another, wherein the die button has a bore which is dimensioned to receive the rivet section,
 b) carrying out a relative movement of the punch rivet with the free end of the rivet section to the fore towards the components arranged on one another and in the direction of the die button, (Continued)

Figure 1A:
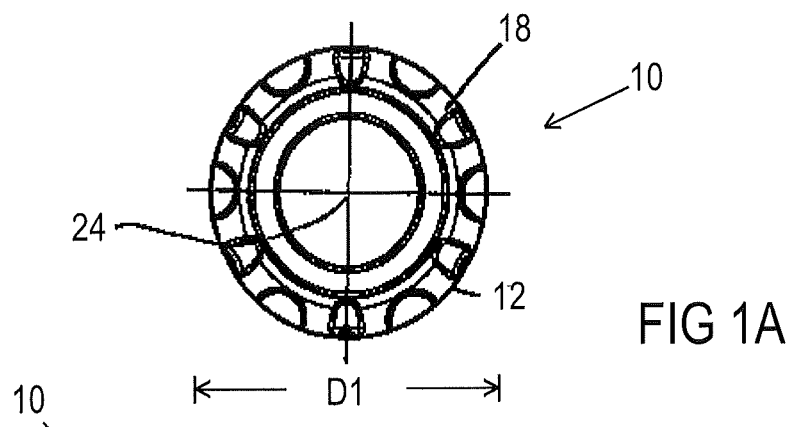

c) piercing of the components with the free end of the rivet section and introduction of the rivet section into the bore of the die button until the component contact surface comes into contact and the component adjacent to the flange,
d) using a plunger in order to dilate the punch rivet at least locally and
e) forming a rivet bead by reshaping the free end region of the rivet section.

7 Claims, 8 Drawing Sheets

(51) Int. Cl.
*F16B 19/08* (2006.01)
*B23P 19/06* (2006.01)
*B21J 15/14* (2006.01)
*B21J 15/36* (2006.01)
*B29C 65/56* (2006.01)
*B29C 65/00* (2006.01)

(52) U.S. Cl.
CPC .......... *B23P 19/063* (2013.01); *B29C 65/562* (2013.01); *B29C 65/568* (2013.01); *B29C 66/1122* (2013.01); *B29C 66/21* (2013.01); *B29C 66/41* (2013.01); *B29C 66/721* (2013.01); *B29C 66/81423* (2013.01); *B29C 66/81431* (2013.01); *B29C 66/8322* (2013.01); *F16B 5/04* (2013.01); *F16B 19/086* (2013.01); *B29C 66/7212* (2013.01); *B29C 66/72141* (2013.01); *B29C 66/72143* (2013.01); *B29C 66/7392* (2013.01); *B29C 66/7394* (2013.01); *B29C 66/742* (2013.01); *Y10T 29/49943* (2015.01); *Y10T 29/5377* (2015.01)

(58) Field of Classification Search
CPC .. B21J 15/06; B29C 65/568; B29C 66/81423; B29C 66/721; B29C 66/81431; B29C 66/41; B29C 66/21; B29C 66/1122; B29C 65/562; B29C 66/8322; B29C 66/72143; B29C 66/7392; B29C 66/72141; B29C 66/7212; B29C 65/60; F16B 5/04; F16B 19/086
See application file for complete search history.

(56) References Cited

U.S. PATENT DOCUMENTS

| | | | |
|---|---|---|---|
| 4,459,073 A | 7/1984 | Muller | |
| 4,543,701 A | 10/1985 | Muller | |
| 4,555,838 A | 12/1985 | Muller | |
| 4,610,072 A | 9/1986 | Muller | |
| 4,727,646 A | 3/1988 | Muller | |
| 7,160,047 B2 | 1/2007 | Mueller | |
| 2006/0080821 A1 | 4/2006 | Yamamoto et al. | |
| 2006/0251495 A1* | 11/2006 | Opper | F16B 5/04 411/501 |
| 2009/0070983 A1 | 3/2009 | Stumpf et al. | |
| 2009/0217507 A1* | 9/2009 | Frank | B21J 15/041 29/525.06 |
| 2011/0164945 A1 | 7/2011 | Lathabai et al. | |

FOREIGN PATENT DOCUMENTS

| | | |
|---|---|---|
| DE | 19747267 A1 | 5/1999 |
| DE | 10015239 A1 | 10/2001 |
| DE | 202005015713 U1 | 12/2005 |
| DE | 102005048863 A1 | 6/2006 |
| DE | 102005052360 A1 | 5/2007 |
| DE | 102006007708 A1 | 8/2007 |
| DE | 102007044635 A1 | 4/2009 |
| DE | 102009048398 A1 | 4/2011 |
| DE | 10201009026 A1 | 8/2011 |
| DE | 102012003972 A1 | 8/2013 |
| EP | 0351715 A2 | 1/1990 |
| EP | 0539739 A2 | 5/1993 |
| EP | 0691900 | 10/1994 |
| EP | 0890397 A1 | 1/1999 |
| EP | 1381785 | 1/2002 |
| EP | 1430229 | 4/2003 |
| EP | 1497073 | 10/2003 |
| EP | 2039947 A2 | 3/2009 |
| GB | 1581825 | 12/1980 |
| JP | 2002093489 A | 3/2002 |
| JP | 2005069451 A | 3/2005 |
| WO | 0016928 | 3/2000 |

\* cited by examiner

PUNCH RIVET AND ALSO A METHOD AND APPARATUSES FOR ATTACHMENT OF INDIVIDUAL COMPONENTS TO ONE ANOTHER OF WHICH AT LEAST ONE COMPONENT IS FORMED BY A WORKPIECE OF COMPOSITE MATERIAL

This patent application claims the benefit of priority to German Patent Application Serial No. 102013217632.5, filed Sep. 4, 2013, which is incorporated herein by reference in its entirety.

The present invention relates to a method and apparatuses for fastening individual components to one another using a punch rivet of which at least one component is formed by a workpiece of composite material.

Punch rivets are known, they are usually used in order to secure two components in the form of sheet metal parts to one another. This is known as "Durchsetzfügen" in German and as "clinching" in English. For this purpose, a punch rivet has a flange of larger diameter, a rivet section of smaller diameter and a ring-like component contact surface at the side of the flange adjacent the rivet section and surrounding the rivet section. This surface is frequently a conical surface and is pressed during the pressing of the punch rivet into the two components into the surface of the upper sheet metal part, with the side of the flange remote from the rivet section being flush with the upper side of the upper sheet metal part.

The free end of the rivet section is formed by a conical surface which converges inwardly and in the direction of the flange. This leads to the rivet section being spread in trumpet-like manner during the pressing in of the punch rivet as a result of the forces acting on the conical surface and to the rivet section not piercing the second component. The components are held together as a result of the wedge action of the trumpet-like shape of the rivet section, which is filled with material of the components.

The object of the present invention is to provide a novel punch rivet which is suitable for the connection of at least two panel-like components to one another of which at least one component consists of a fiber or fabric reinforced plastic, with a high quality rivet joint being achievable which ensures a high strength connection of the components to one another without a pronounced danger existing that the punch rivets that are used can be torn out of one component or a plurality of components or that undesired fatigue effects occur in the course of time.

Frequently one is concerned with joining two or three components (or eventually even more components) to one another, with at least one component consisting of the said fiber or fabric reinforced plastic. It can for example consist of a component of such a composite material and a component of metal, or of two components of such a composite material, or of two components of a composite material of this kind and a component of metal, or of three components of the said composite material.

Hitherto only a few proposals have been made for the mechanical joining of components of the named composite material. Most of these are concerned with the embedding of fastening elements or reinforcement plates into individual components which can be secured together with customary fastening elements. This is, however, relatively complicated and expensive and disturbs the process sequence in the manufacture of the individual components.

U.S. Pat. No. 7,160,047 describes the attachment of fastener elements in the form of bolt elements or nut elements to a component, which consists of a composite material which is defined there as a brittle or resilient component which consists for example of a material having a hollow spaces or pores, such as for example plastics, wood, metal foams, metals which are filled with hollow bodies or plastics or another relatively soft material and which are optionally present in the form of a sandwich construction or as a composite material, for example in the form of a single ply or multi-ply structure with for example two sheet metal or plastic layers with a core of one of the above-named substances or materials.

The present invention is in particular concerned in contrast with workpieces which consists of a fiber or fabric reinforced plastic and in particular those with a duroplastic matrix material, with the invention have also being suitable for use with workpieces in the form of sheet metal parts. In contrast to the materials defined in U.S. Pat. No. 7,160,047 the present workpieces are relatively hard and thin so that other considerations have to be made for the processing of the materials in the sense of attachment of fastener elements.

With regard to the definition of composite materials which ca be used in the context of the present invention the following is explained:

Under the designation fiber or fabric reinforced plastic one understands composite materials with high strength fibers such as for example aramid fibers, carbon fibers or glass fibers which are either present as relatively short filling fibers or as long filaments, or in the form of a fabric manufactured from filaments, and embedded in the matrix material of plastic. Thermoplastic materials can admittedly be used as the plastic; however, duroplastic plastics are normally used for coachwork components. The corresponding components are generally present in panel form, as a rule with a three-dimensional shape.

In order to satisfy the above named object there is provided, in accordance with the invention, a punch rivet for the attachment of individual components to one another, of which at least one component is preferably formed by a workpiece of composite material, with the punch rivet having a flange of larger diameter, a rivet section of smaller diameter and a ring-like component contact surface at the side of the flange adjacent to the rivet section and surrounding the rivet section, wherein the rivet section has a ring surface at its free end for the piercing of the two workpieces, with the ring surface standing at least substantially perpendicular to the central longitudinal axis of the punch rivet and optionally having an inner concave ring surface which forms the transition from the end face of the punch rivet to the hollow inner space of the rivet section, with the punch rivet having a central passage which extends over the full length of the punch rivet.

In accordance with a special embodiment of the punch rivet, the punch rivet has an inwardly projecting ring shoulder in the region of the rivet section.

With a design of this kind one endeavors, in contrast to customary punch rivets, to fully pierce the components which lie on one another, so that a high quality rivet bead can be generated at the side of the lower component remote from the flange. For this purpose the punch rivet of the invention must be significantly longer than the total thickness of the stack of the components lying on one another, in contrast to known punch rivets which do not fully penetrate the stack.

Furthermore, the invention relates to the recognition that components of a fibre or fabric reinforced plastic, in particular one with a duroplastic matrix material, tends to crumble under the forces acting at the free end of the piercing section, which is exploited here in the sense that the handling of the piercing slug which arises is facilitated because it has a transverse dimension which corresponds approximately to the inner diameter of the rivet section.

The method of the invention for the attachment of individual components to one another using the above-named punch rivet in accordance with the invention includes the following steps:
a) arrangement of the die button against one of the two components to be secured to one another, which are placed on one another, wherein the die button has a bore which is dimensioned to receive the rivet section,
b) carrying out a relative movement of the punch rivet with the free end of the rivet section to the fore towards the components arranged on one another and in the direction of the die button,
c) piercing of the components with the free end of the rivet section and introduction of the rivet section into the bore of the die button until the component contact surface comes into contact with the component adjacent to the flange,
d) using a plunger in order to dilate the punch rivet at least locally and
e) forming a rivet bead by reshaping the free end region of the rivet section in order to clamp the components between the flange and the rivet bead.

In this manner a high quality connection of the components to one another is first brought about. With the step of using a plunger in order to at least locally dilate the punch rivet a wholly new way is pursued of introducing a punch rivet and of at least preparing the beading over operation. The dilation of the punch rivet can be brought about by the axial movement of a plunger through the passage and coming from the flange side of the punch rivet, with the plunger being provided with a ring shoulder which brings about the dilation, which tapers in the direction of the free end adjacent the punch rivet and which has a maximum diameter which is larger than the smallest diameter of the passage.

Through the dilation of the flange rivet a partly loosened matrix material with the component around the pierced holes can be pressed together so that the punch rivet sits firmly in the punch holes. The undamaged material of the components radially outside of the pierced holes is hereby set under pressure and this particularly favorable for the fatigue characteristics.

The ring shoulder of the plunger which tapers in the direction of the free end of the plunger adjacent the punch rivet and which has a maximum diameter which is larger than the diameter of the passage, but smaller than the outer diameter of the rivet section, is preferably pressed into the passage of the punch rivet and brings about a dilation of the passage within the components. In this way the above-mentioned action is enhanced and the strength of the metallic punch rivet increases as a result of the deformation.

The method can be further developed in that the central passage has an inwardly directed projection at the region of the rivet section, with the ring shoulder of the plunger being introduced into the passage of the punch rivet until it enters into contact with the inwardly directed projection of the rivet section and presses the latter and the free end of the rivet section outwardly in order to form a rivet bead.

In this way not only is the desired dilation of the punch rivet brought about over its entire length, but rather the rivet bead is at least partly brought about by the corresponding deformation, and indeed while the components are being firmly pressed together in the axial direction of the punch rivet in the press or in the tool which is used. This likewise leads to a high quality rivet connection.

The use of a plunger which forms a part of a tool that is used is particularly favorable in that the plunger is reused. It is thus not to be compared with a mandrel which is used with blind rivets and which has to be present as a disposable part from each blind rivet and has to be broken each time in order to set the rivet bead. Furthermore, using the plunger there are no torn-off heads as was the mandrel of a blind rivet which could be lost and could cause damage. In other respects the plunger in accordance with the invention can also not be compared with the mandrel of a blind rivet because it operates with a compressive force and not with a tensile force as is the case with the mandrel of the blind rivet.

The above-named methods can be improved when the plunger has a guide region at the front end which is guided in the passage of the hollow rivet section.

Furthermore, it can be advantageous, when the central passage of the punch rivet has a larger diameter in the region of the flange in comparison to the hollow rivet section, with the diameter corresponding substantially to the diameter of the ring shoulder, whereby the flange of the punch rivet is essentially not dilated by the plunger. The dilation of the punch rivet is not required precisely at this point because the transition from the rivet section into the flange of the punch rivet mainly takes place via a fillet which itself serves for the compressive stress.

The plunger can moreover have a smaller diameter at the side of the ring shoulder remote from the punch rivet in order to minimize frictional forces within the passage and wear of the plunger.

The piercing slugs which are arisen from the components in the steps b) and c) are preferably dispensed off through the preferably divergent bore of the first die button together with the crumbled material which is produced by the action of the free end of the rivet section.

A further particularly favorable layout of the method is possible when the die button is provided with an end recess, which accommodates the flange of the punch rivet, arranged at a side of the components which are placed against one another, when the die button has a passage which starts from the center of the ring recess and is dimensioned to dispense the pierced slugs and when the rivet section of the punch rivet projects out of the end of the die button. The corresponding method includes the following steps:
using a hold-down member on the other side of the components which are placed against one another,
piercing the components with the free end of the rivet section by a relative movement between the die button and the hold-down member until the rivet section is received in a passage of the hold-down member and the component contact surface comes into contact with the component adjacent to the flange and piercing slugs are generated from the components,
moving a plunger through the passage of the hold-down member and through the passage of the punch rivet, with the plunger having a front end region and a ring shoulder arranged behind the front end region, with the front end region of the plunger pressing the piercing slugs through the passage of the punch rivet and with the free end region of the rivet section which projects at the side of the components remote from the flange being shaped by the ring shoulder into a rivet bead.

Here also a dilation of the pierced rivet is effected and indeed in the simplest case only in the region of the free end of the rivet section which projects out of the components. This is also very advantageous since the components are pressed together during this formation of the rivet bead as a result of the tools that are used (press, robot or force-actuating tongs).

In this embodiment the passage of the rivet can also be dilated as explained above in conjunction with the movable plunger.

Moreover, the front end region of the plunger preferably has a smaller diameter than the internal diameter of the rivet section and is preferably rounded at the free end in order to hereby deform the pierced slugs in shell-like manner and reduce them in diameter, whereby they can be more easily pressed through the passage of the punch rivet and into the passage.

In the above-named method, which operates with a hold-down member which can be part of a setting head, the hold down member can be equipped with movable segments which in the closed position engage around the free end of the rivet section without clearance or with little clearance and can be moved apart from one another in order to permit the formation of the rivet bead.

In the previously described method a further method step can take place such that By using a second die button with a central post and a concavely rounded ring surface surrounding the central post, the end of the rivet section projecting out of the components can be beaded over or calibrated to form a rivet bead, with the central post of the die button preferably being of divergent form in the direction away from the flange. When one is not satisfied with the mechanical properties of the rivet bead formed by means of the plunger, or with its shaping, or wishes to improve it, then this can take place as explained directly above with the aid of a second die button which fully forms the rivet bead or corrects its shape, for example in the sense of the bead flushly contacts the direct adjacent component and does not have contact only over of a small area.

The invention is also concerned with apparatuses which are designed to carry out the method. Such advantageous apparatuses can be taken from the claims 16 to 26.

Figure 1B:
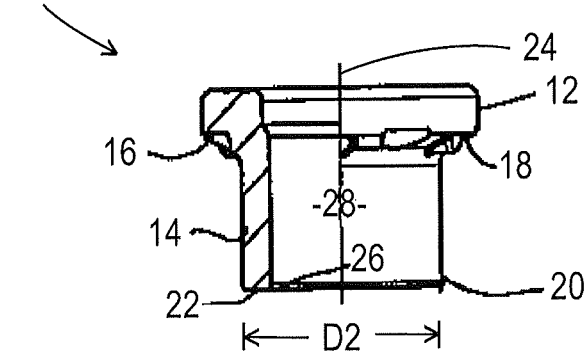
Figure 1C:
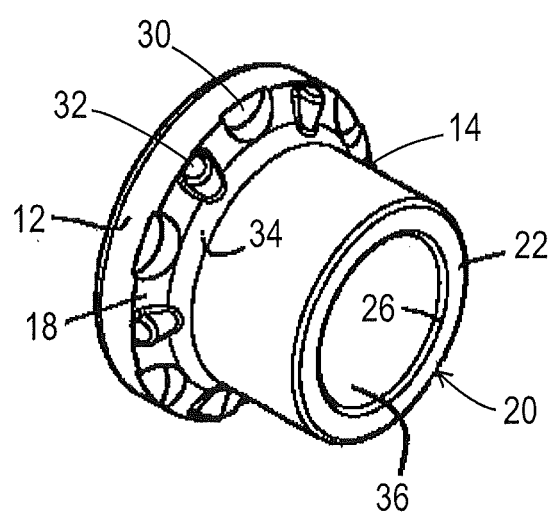
Figure 2A:
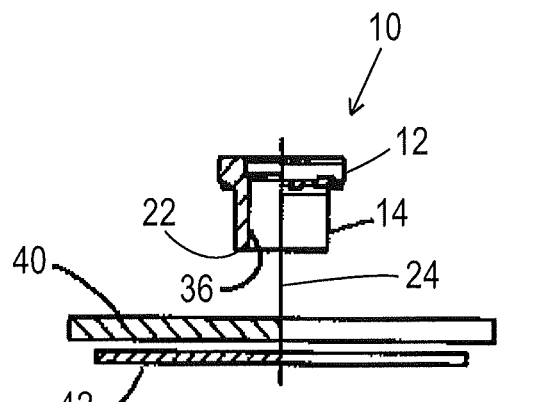
Figure 2B:
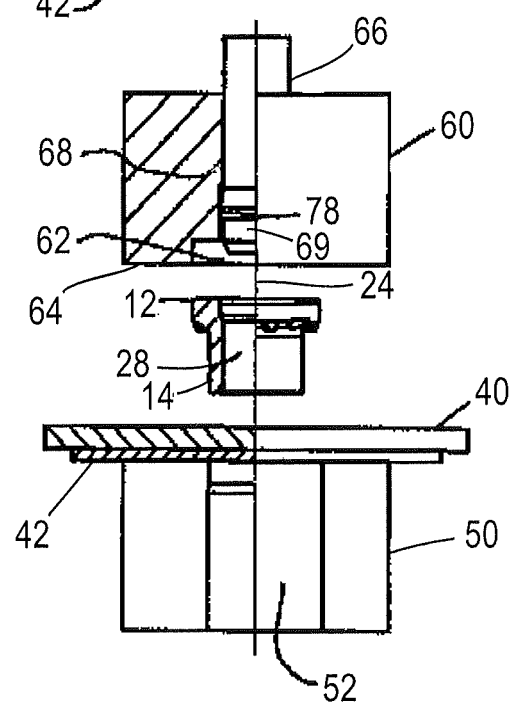
Figure 2C:
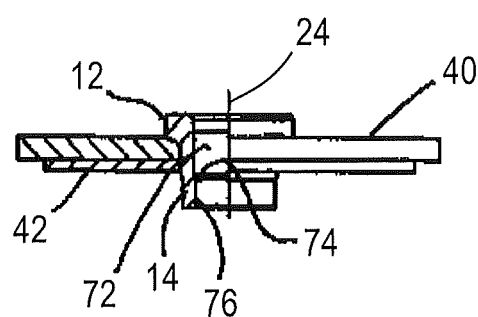
Figure 3A:
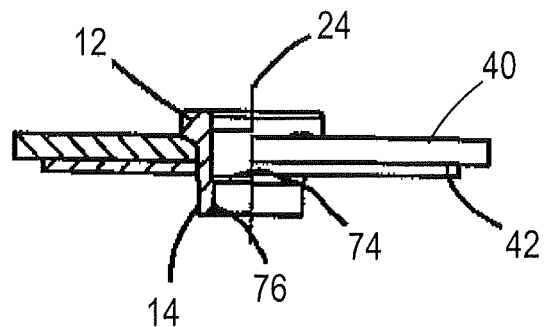
Figure 3B:
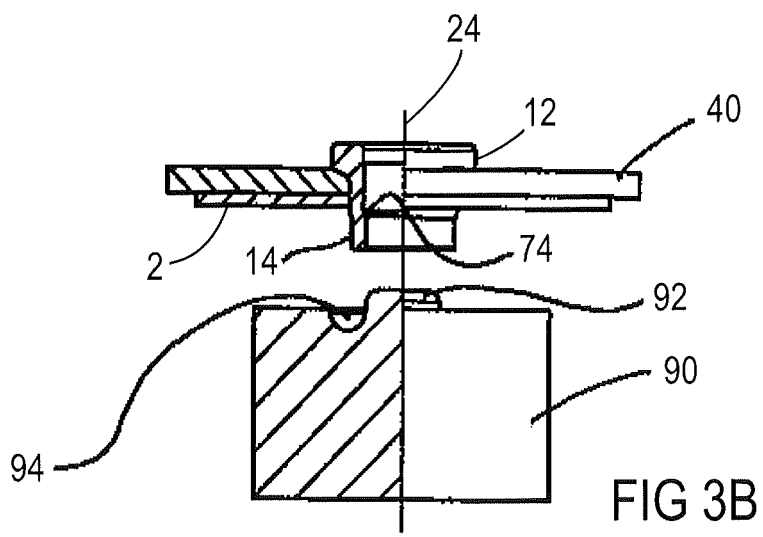
Figure 3C:
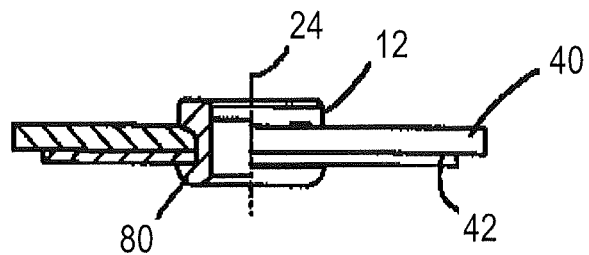

Further developments of the invention will now be described in more detail with reference to practical embodiments and to the drawings in which are shown:

FIGS. 1A to 1C a punch rivet in accordance with the invention and indeed in an end view (FIG. 1A) onto the rivet section of the punch rivet, in a partly sectioned side view (FIG. 1B) and in a perspective representation (FIG. 1C), FIGS. 2A to 2C representations of three phases of the attachment of a punch rivet in accordance with FIGS. 1A to 1C to two components to be secured to one another, with the FIG. 2A showing the starting position, FIG. 2B the processing of the elements in accordance with FIG. 2A and FIG. 2C the resulting first product, FIGS. 3A to 3C representations of further phases of the processing of the first product of FIG. 2C, here shown again as FIG. 3A, by means of the apparatus of FIG. 3B in order to generate a finished product in accordance with FIG. 3C.

Figure 4A:
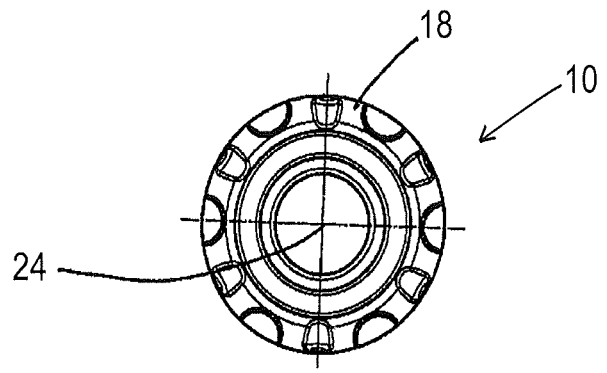
Figure 4B:
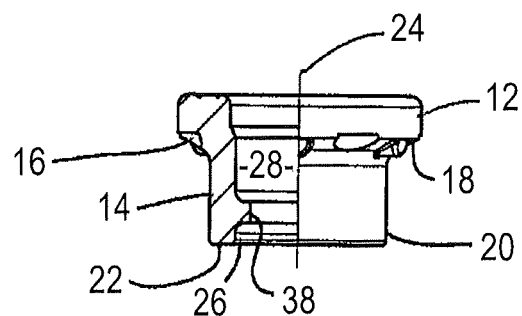
Figure 4C:
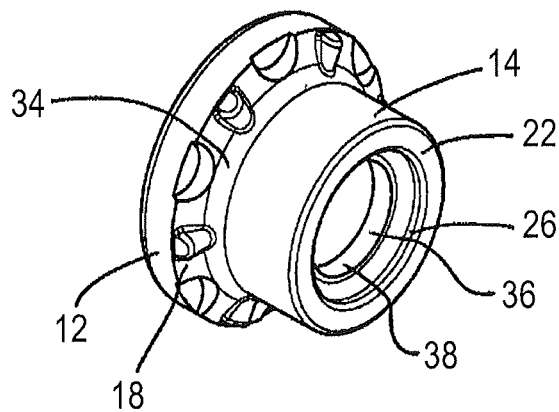
Figure 5A:
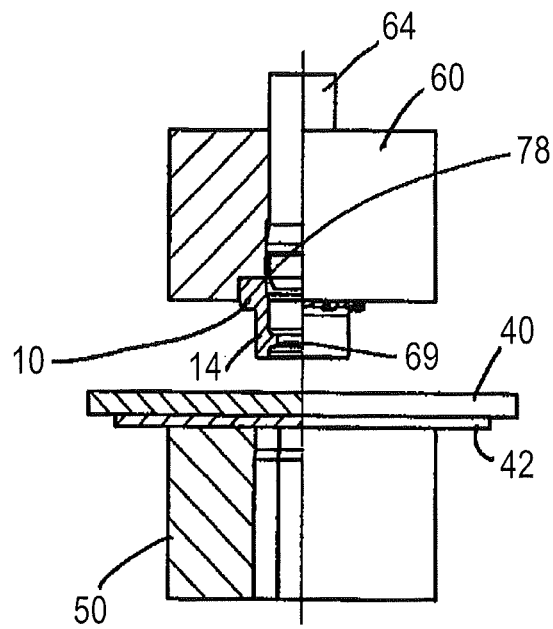
Figure 5B:
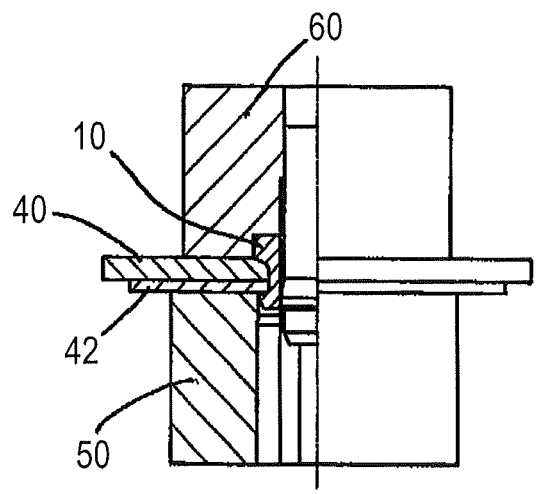
Figure 5C:
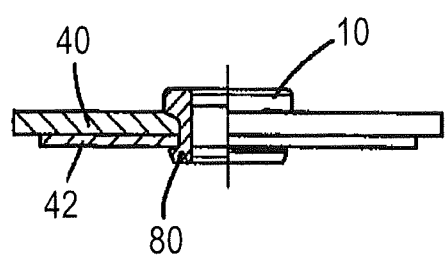
Figures 6A, 6B:
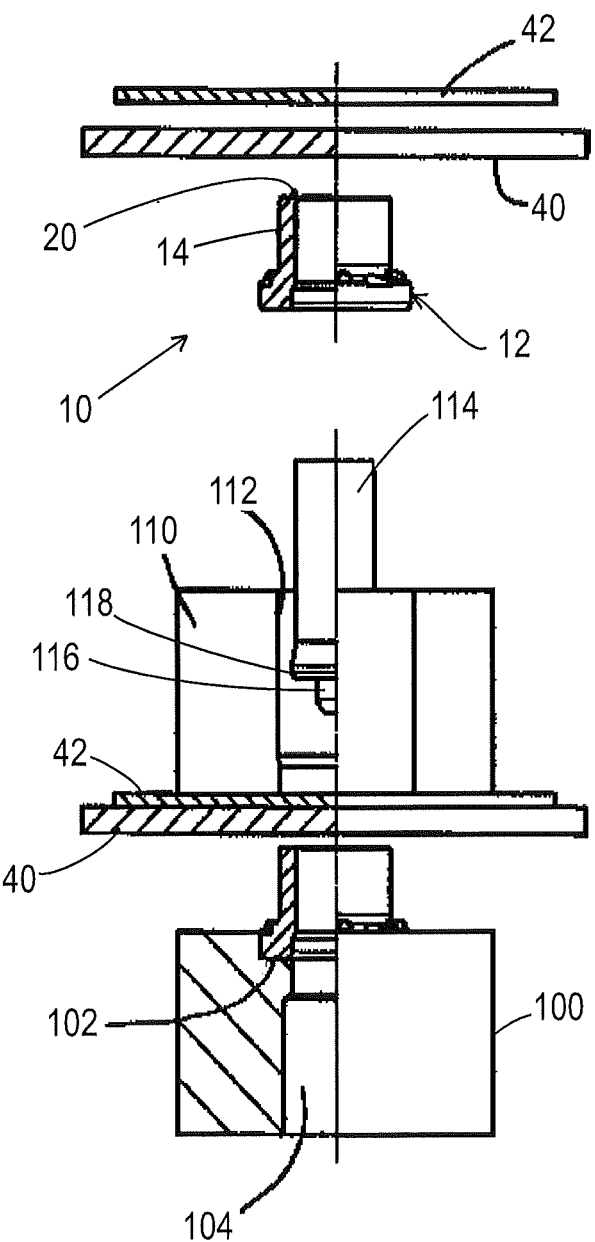
Figure 6C:
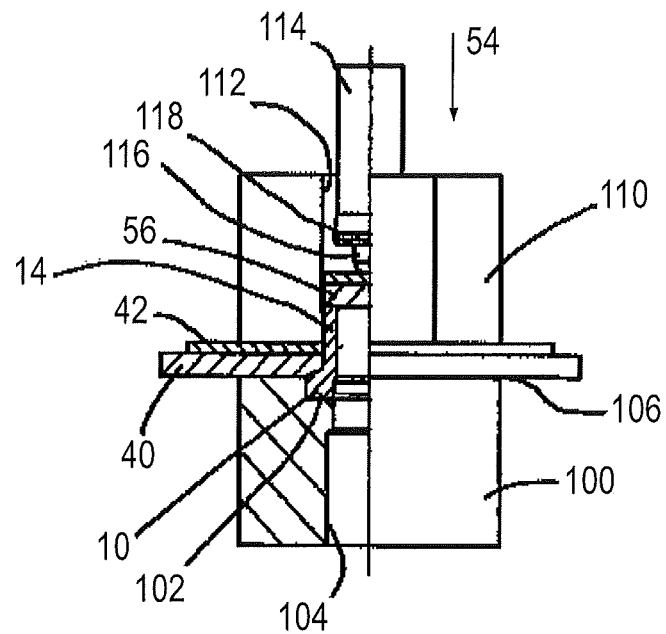
Figure 6D:
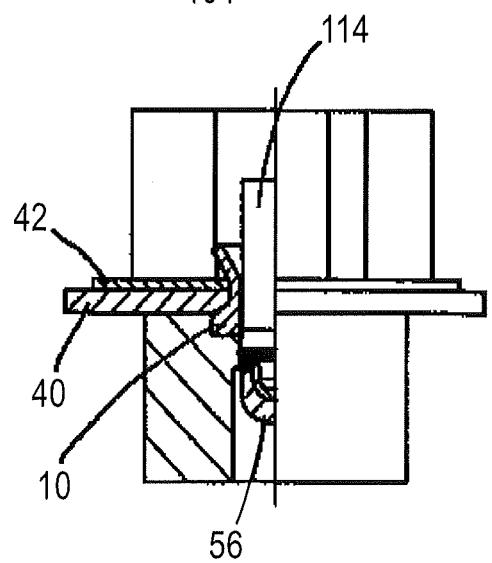
Figure 6E:
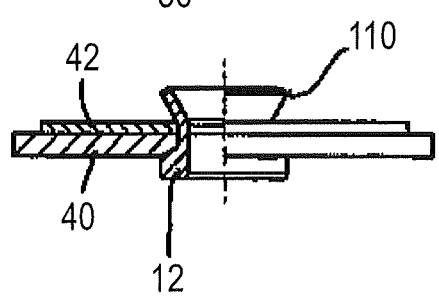
Figure 7:
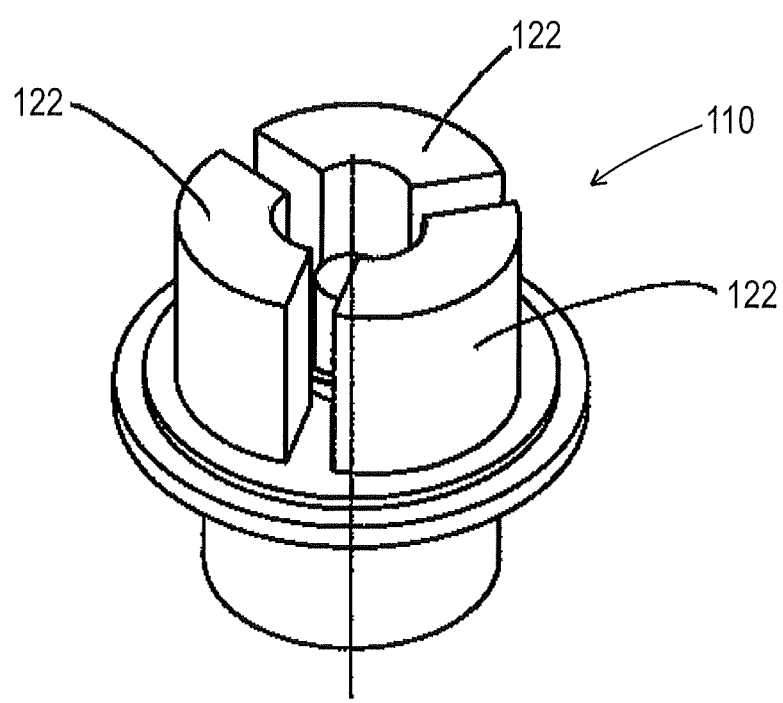

FIGS. 4A to 4C a further punch rivet in accordance with the invention and indeed in an end view (FIG. 4A) on the rivet section of the punch rivet, and in a partially sectioned side view (FIG. 4B) and in a perspective representation (FIG. 4C), FIGS. 5A to 5C a series of drawings to explain the processing of the punch rivet in accordance with the invention and in accordance with FIGS. 4A to 4C, with FIG. 5A showing the starting position, FIG. 5B showing the situation of after the closing of the tools that are used and FIG. 5C showing the finished component assembly, FIGS. 6A to 6E a series of drawings to explain an alternative processing of a punch rivet in accordance with the invention in accordance with FIGS. 1A to 1C, with FIG. 6A showing the starting position, FIG. 6B showing the situation after the introduction of the components into the tools that are used, FIG. 6C showing the situation after the closing of the tools that are used, FIG. 6D showing the removal of the pierced slugs and FIG. 6E showing the finished component assembly and FIG. 7 a hold-down member in accordance with the invention in a perspective representation.

Referring now to the FIGS. 1A to 1C a punch rivet 10 is shown there for the attachment of individual components 40, 42 to one another (FIG. 2A) of which at least one component 40 is formed by a workpiece of composite material.

The punch rivet 10 has a flange 12 of larger diameter D1, a rivet section 14 of smaller diameter D2 and a ring-like component contact surface 18 at the side 16 of the flange adjacent to the rivet section 14 and surrounding the rivet section 14. The rivet section 14 has at its free end 20 a ring surface 22 for the piercing of the two components 40, 32 that stands at least substantially perpendicular to the central longitudinal axis 24 of the punch rivet 10 and has an inner concave ring surface 26 which forms the transition from the end face 22 of the punch rivet 10 into the hollow internal space 28 of the rivet section. This concave ring surface 26 is not essential and it is also not essential for the ring surface 22 to stand strictly perpendicular to the central longitudinal axis 24, it could form an enclosed angle of 80 to 100° with the longitudinal axis and could also be rounded.

The component contact surface 18 is shown here as a conical surface, this is however also not essential, this surface could also stand perpendicular to the longitudinal axis. Recesses 30 and noses 32 are located at the component contact surface 18 such as are known as features providing security against rotation for bolt elements. Such features 30 and 32 are not essential for a punch rivet 10 because for punch rivets security against rotation is not required. Nevertheless they help to achieve an intimate connection with the adjacent component.

The area of the component contact surface 18 is defined by the diameter of the flange 12 and this should be selected sufficiently large that the surface pressure is designed for the material having regard to the properties of the first component and the forces which originate in operation from the punch rivet or are transmitted by the punch rivet. The rivet section 14 has a right cylindrical hollow internal space 28 and a right cylindrical jacket surface. The length of the rivet section exceeds the total thickness of the components which are to be secured to one another by an amount which permits the formation of a rivet bead.

In this example, the punch rivet 10 is of hollow shape, i.e. such that a central passage corresponding to the hollow internal space 28 extends over the full length of the hollow rivet.

The reference numeral 34 points to a fillet, which forms the transition from the rivet section 14 into the sheet metal contact surface 18.

The method for the attachment of individual components 40, 42 to one another using a punch rivet in order to form a first product will now be described with reference to FIGS. 2A to 2C. In this example at least the upper component 49 is formed by a workpiece of composite material. The component 42 can be a sheet metal part or can be a further workpiece of composite material. It will be understood that in this application (including the patent claims) the term "composite material" is used in the sense of the abovequoted definition. It is also noted that the punch rivet can be so attached that the component contact surface 18 comes to lie, as shown here, on the upper component 40 or inverted, so that it contacts the sheet metal component 42. Furthermore, the method is not restricted to the attachment of two components to one another.

In FIG. 2A the punch rivet 10 of FIG. 1A bis 1C is arranged above the first component 40, with the free end face 20 of the rivet section 14 being designed to pierce the two workpieces 40, 42, and with the punch rivet further having a central passage which extends over the full length of the hollow rivet, the method includes the following steps:

a) Arrangement of the die button 50 against one of the components which are to be secured to one another and which are placed on one another, with the die button having a bore 52 which is dimensioned to receive the rivet section 14, i.e. has a diameter which corresponds to that of the rivet section or is fractionally larger than this.

b) Carrying out a relative movement of the punch rivet 10 in the arrow direction 54 by means of the piercing head 60 with the free end 20 of the rivet section to the fore against the components 40, 42 arranged on one another and in the direction of the die button 50, For this purpose the piercing head has a recess 62 which receives the flange 12 of the punch rivet.

c) Piercing of the components 40, 42 with the free end 22 of the rivet section 14 and introduction of the rivet section into the bore 52 of the die button 50 until the component contact surface 18 comes into contact with the component 40 adjacent the flange 12. At the same time the underside 64 of the piercing head comes into contact with the upper component 40. On the piercing of the components a piercing slug (not shown here) arises from each component which falls through the bore 52 together with any crumbled material of the components 40, 42.

d) Utilizing a plunger 66 in order to at least locally dilate the punch rivet 10. In this connection it can be seen in FIG. 2B that the plunger 66 is guided in a bore 68 of the piercing head 60 for an axial movement in the arrow direction 54 relative to the piercing head 60 along the central longitudinal axis 24 of the punch rivet i.e. of the piercing or setting head. The dilation is evident from the reference numerals 72 in FIG. 2C, above all through the transition 74 into the original internal diameter 36 of the rivet section 14 where this transition 74 here being formed by the ring shoulder 78 of the plunger 66 which comes to lie approximately at the level of the underside of the lower component 42 in FIG. 2B. The ring shoulder 78 is formed by a tapering of the plunger in the direction towards the lower end so that the dilation of the hollow space 28 of the punch rivet 10 takes place progressively. The ring shoulder 78 has a maximum diameter which is larger than the smallest diameter of the passage 36 but is significantly smaller than the outer diameter of the rivet section 14 of the punch rivet 10.

The component assembly which has arisen from the previously described method is shown in FIG. 2C. It can be designated as a first product which proceeds in the context of a two-path or two-stage method from the first stage.

The second stage is shown in FIGS. 3A to 3C, in this respect the drawing in accordance with FIG. 3A is identical with the drawing in accordance with FIG. 2C it was only repeated in order to simplify the representation.

In the second stage of the manufacturing process the first product is processed further to the finished product and indeed by the further step:

e) Forming a rivet bead 80 by shaping the free end region 15 of the rivet section 14 in order to clamp the components 40, 42 between the flange 12 and the rivet bead 80. This takes place with the die button 90 of FIG. 3B. This die button 90 is provided with a central post 92 and a concavely rounded ring surface 94 surrounding the central post 92 whereby the end of the rivet section 14 remote from the flange 12 which projects out of the components 40, 42 is beaded over to form a rivet bead 80. The finished product can be seen in FIG. 3C.

The attachment of the punch rivet by means of the piercing head 60 and the die button 50, optionally while using the further die button 90, has only been so portrayed above for the purpose of explaining the principles.

For the attachment of the punch rivet 10 it is normally introduced into a so-called setting or piercing head which is built into a press and which delivers punch rivets or fastener elements one after the other to a sequence of workpieces 40, 42. In this connection a spring-loaded hold down member (likewise not shown but also well-known per se) is normally used which surrounds the punch rivet or the fastener element and which serves to press the workpiece, here the components 40, 42 against the end face of the die button 50 so that the workpiece 40, 42 can be held in its intended position and clamped together. The punch rivet 10 or the fastener element is normally moved in the direction towards the workpiece 40, 42 by means of a plunger (likewise not shown) of the piercing head 60 in the direction towards the workpiece 40, 42, with the piercing head being so designed that a sequence of punch rivets 10 can be fed to the piercing head but only one punch rivet 10 is supplied to the respective workpiece, here consisting of the two components 40, 42, and punched into the workpiece for each stroke of the press.

As explained above the die button 50, is located beneath the workpiece 40, 42 and normally has a cylindrical shape which is let into a corresponding bore (not shown) of a receiving tool (likewise not shown).

As usual for the attachment of fastener elements, this discussion relates to a piercing head 60 which is arranged at the upper tool of a press or at an intermediate platen of the press, whereas the tool which receives the die button 50 is the intermediate platen of the press or the lower tool of the press respectively. An inverted arrangement would also be possible in which the setting head is arranged at the lower tool of the press or at an intermediate platen of the press and the free end 20 of the rivet section 14 is directed upwardly, whereas the die button 50, which then faces downwardly, is then located at the intermediate platen or at the upper tool of the press respectively, an arrangement which will later be explained in more detail in connection with FIG. 6B.

It is in no way essential to use a press for the attachment of the punch rivet to the workpiece. By way of example a robot, for example in accordance with the European patent 0 691 900 could be used, with the die button 50 and the piercing head then being carried by the robot. However, a percussion tool or another tool could also be used for the attachment of the punch rivet to the components, for example a tool in accordance with one of the following protective rights DE-PS 197 47 267, EP 0 890 397 or DE-PS 197 01 088.

It is indeed generally customary to attach fastener elements 10 to a workpiece with the central longitudinal axis 24 arranged vertically. However, an orientation of this kind is in no way essential. Instead of this the longitudinal axis 24 could have any desired orientation in space. Accordingly, when geometrical terms such as vertical or top or bottom or above and below are used in this application, then this is to be understood in such a way that the designations simply relate to the orientation of the corresponding figure and should in no way be restrictively construed.

Depending on the purpose the components in the form of a finished product in accordance with FIG. 3C are intended to satisfy, the manufacture in two passes in accordance with FIGS. 2A to 2C, on the one hand, and FIGS. 3A to 3C, on the other hand, and can also take place in different ways. The manufacture of the first product and of the finished product can also take place in different stages of one plant, for example in a progressive tool if smaller sheet metal parts are to be attached to composite components, above all when a plurality of operations are to be carried out and can be realized in a press. Alternatively, the first product can be manufactured in one plant and the final product in a second plant of the same factory; the two plants can be part of a transfer system; or the two plants can be located at different locations in the same factory or in different factories or in different areas of the same production hall.

Furthermore, the possibility exists of placing a further pre-holed component (not shown) in the second manufacturing stage in accordance with FIGS. 3A to 3C over the projecting rivet section against the underside of the second component 42 and this further component (which can also consist of plural components) can then be fixed to the two first named components 40 and 42 by the subsequently formed rivet bead 80.

The method just explained above can also take place in such way that the piercing slugs 56 which arise are removed as indicated through the preferably diverging bore 52 of the first die button 50.

It is particularly favorable when the central passage 36 extends over the entire length of the hollow rivet and has an inwardly directed projection 38 in the region of the rivet section 14 as is shown in FIGS. 4A to 4C. These Figures show an alternative form of the punch rivet 10 which is provided with the same reference numerals as in FIGS. 1A to 1C. It will be understand that parts which are provided with the same reference numerals have the same form or function as the previously described parts unless something is stated to the contrary, so that a renewed description of the parts, or of their function, is not required, but rather the previous description applies. This convention also applies for all parts described here and the further description will concentrate only on the differences. Here the only difference lies in the fact that the passage 36 of the punch rivet has an inwardly directed projection 38 in the region of the free end of the rivet section 14.

With this design of the punch rivet 10 the method then proceeds as is shown in FIGS. 5A to 5C.

There, after the piercing of the components 40, 42 by the free end 20 of the rivet section 14 the ring shoulder 78 is introduced into the passage 36 of the punch rivet 10 until it comes into contact with the inwardly directed projection 38 of the rivet section 14 and presses the latter and the free end region 15 of the rivet section outwardly, in order to form a rivet bead 80 in accordance with FIG. 5C. With this the first product is finished and counts as a finished product, since this is a high quality rivet bead 80.

If one wishes to have a better shaping of the rivet bead 80 then this can be achieved by using tools above all the die button 90 which are shown in FIGS. 3A to 3C and were described in conjunction with these Figures. Since then no large deformation of the rivet is necessary one can speak here of a calibration of the rivet bead.

An alternative process for the attachment of the punch rivet 10 in accordance with FIGS. 1A to 1C will now be explained with reference to FIGS. 6A to 6E. FIG. 6A first shows the general geometrical arrangement of the parts with the punch rivet 10 beneath the component 40 with the flange at the bottom and the free end 20 of the rivet section 14 directly below the first component 40. The component 42 is here arranged above the first component 40 which is however not essential. As can be seen from FIG. 6B in this embodiment a die button 100 is used having an end face recess 102 which receives the flange 12 of the punch rivet on the one side of the components 40, 42 which are placed on one another, in this case beneath the components 40, 42. The die button 100 has a passage 104 which starts from the center of the ring recess 102 and is dimensioned to dispose of the piercing slugs 56 (FIG. 6C) and the rivet section 14 of the punch rivet 10 projects out of the end face 106 of the die button 100 with the method including the following steps:

using a hold-down member 110 on the other side of the components 40, 42 which are placed against one another, piercing the components 40, 42 with the free end 20 of the rivet section 14 by a relative movement in the direction of the arrow between the die button 100 and the hold-down member 110 until the rivet section 14 is received in a passage 112 of the hold-down member 110 and the component contact surface 18 comes into contact with the component 40 adjacent to the flange 12, with piercing slugs 56 being generated from the components 40, 42, moving a plunger 114 through the passage 112 of the hold-down member 110 and through the passage 36 of the punch rivet 10, with the plunger 114 having a front end region 116 and a ring shoulder 118 arranged behind the front end region 116, with the front end region 116 of the plunger pressing the piercing slugs 56 through the passage 36 of the punch rivet and the free end region 15 of the rivet section 14 which projects at the side of the components 40, 42 remote from the flange 12 being shaped by the ring shoulder 118 into a rivet bead 120.

Various variants of the method explained above are possible. It is for example not essential that the passage 36 of the punch rivet 10 is dilated in the region of components 40, 42 by the plunger 114 or by its ring shoulder 118, it will be sufficient if only the free end region 20 of the rivet section 14 which projects out of the components 40, 42 is reshaped to the rivet bead 120 by the ring shoulder 118.

Furthermore, the possibility exists of reshaping or calibrating the rivet bead 120 by means of a die button 90 in accordance with FIG. 3B.

The die button 100 in the illustration in accordance with FIG. 6B is actually only suitable for a lay-in process at which the punch rivets 10 are laid one after the other into the die button 100. For an automated production the die button 100 can be replaced by a setting or piercing head which permits the automatic supply of punch rivets 10.

Furthermore, the hold-down member 110 is shown in FIG. 6B as a solid component which is also basically possible. It is however better to use a construction of the hold-down member in accordance with FIG. 7.

The hold-down member in accordance with FIG. 7 is equipped with movable segments 122. The segments 122 are in the shown closed position in operation in which they surround the free end region 15 of the rivet section without clearance or with little clearance and can be moved apart from one another in order to permit the formation of the rivet bead 120. Examples of die buttons with movable segments are known for the processing of punch rivets in which the sheet metal material is not pierced (see for example WO00/16928) and can be modified for the purpose of the present invention in order to realize the hold-down member 110 in accordance with the invention.

Furthermore the hold-down member 110 of FIG. 7 can be part of a setting or piercing head. One advantage of a hold down member is that it serves to clamp the components 40, 42 together during the piercing operation, between itself and the die button (for example 100), and this is very important to achieve a clean piercing operation.

In all embodiments materials can be named as an example from the material of the punch rivets which, in the context of cold deformation, achieve the strength values of class 8 in accordance with the ISO standard or higher, for example a 35B2 alloy in accordance with DIN 1654. Also aluminum alloys, in particular those of higher strength can be used for the punch rivets, for example AlMg5. Fastener elements of higher strength magnesium alloys, such as for example AM50, can also be considered.

LIST OF REFERENCE NUMERALS 10 punch rivet
12 flange
14 rivet section
15 free end of rivet section
16 side of the flange adjacent the rivet section
18 component contact surface
20 End
22 ring surface
24 longitudinal axis
26 cocabe ring surface
28 hollow internal space of rivet section
30 recesses
32 nose
34 fillet radius
36 passage of the punch rivet
38 projection
40 component
42 component
50 die button
52 bore,
54 arrow direction
56 piercing slug
60 piercing head,
62 recess of the piercing head
64 underside
66 plunger
68 bore
69 guide region
72 dilated portion
74 transition
76 inner diameter
78 ring shoulder
80 rivet bead
90 die button
92 central post
94 concavely rounded semi-toroidal ring surface
100 die button
102 recess
104 passage
106 end face
110 hold down member
112 passage
114 plunger
116 end region
118 ring shoulder
120 rivet bead
122 segments The claims are as follows:

1. A method for the attachment of individual components (40, 4)2 to one another using a punch rivet (10), wherein at least one of the components is formed by a workpiece (40) of composite material, wherein the punch rivet has a flange (12) of larger diameter (D1), a rivet section (14) of smaller diameter (D2) and a ring-like component contact surface (18) at the side (16) of the flange (12) adjacent to the rivet section and surrounding the rivet section (14), wherein the rivet section (14) is formed at its free end face (20) for the piercing of the components (40,42), with the punch rivet (10) furthermore having a central passage (36) which extends over the full length of the punch rivet (10) and the method includes the following steps:

a) arrangement of a die button (50) against one of the two components (40, 42) to be secured to one another, which are placed on one another, wherein the die button has a bore (52) which is dimensioned to receive the rivet section (14), b) carrying out a relative movement of the punch rivet (10) with a free end of the rivet section (14) to the fore towards the components (40, 42) arranged on one another and in the direction of the die button (50), c) piercing of the components (40, 42) with the free end (20) of the rivet section (14) and introduction of the rivet section (14) into the bore (52) of the die button (50) until the component contact surface (18) comes into contact with the component (40) adjacent to the flange (12), d) after piercing, dilating the punch rivet by the axial movement of a plunger (66) through the central passage (36) towards the free end face of the punch rivet (10), with the plunger (66) being provided with a ring shoulder (78) which brings about the dilation up to an underside of the lower component, which tapers, in the direction of the free end of the plunger adjacent to the punch rivet (10) and has a maximum diameter which is larger than the smallest diameter of the passage (36), and e) after dilating, forming a rivet bead (80; 120) by reshaping the free end region (15) of the rivet section in order to clamp the components (40, 42) between the flange (12) and the rivet bead (80; 120).

2. A method in accordance with claim 1, wherein the ring shoulder (78) of the plunger (55) which tapers in the direction of the free end of the plunger (66) adjacent to the punch rivet and has a maximum diameter which is larger than the diameter of the passage (36) but is smaller than the outer diameter of the rivet section (14) is pressed into the passage (36) of the punch rivet and brings about a dilation of the passage (36) within the components (40, 42).

3. A method in accordance with claim 1, in which the plunger (66) has a guide region at the front end which is guided in the passages (36) of the hollow rivet section (14).

4. A method in accordance with claim 1, wherein the central passage (36) of the punch rivet (10) has an enlarged diameter (37) in the region of the flange (12) in comparison to the hollow rivet section (14) and corresponds at least substantially to the diameter of the ring shoulder (78), whereby the flange (12) of the punch rivet is substantially not dilated by the plunger (66).

5. A method in accordance with claim 1, wherein the plunger has a smaller diameter at the side of the ring shoulder (78) remote from the punch rivet in order to minimize frictional forces within the passage (36).

6. A method in accordance with claim 1, wherein piercing slugs (56) arise in the steps b) and c) from the components, the piercing slugs disposed of through the divergent bore (52) of the first die button (50).

7. A method in accordance with claim 1, with the further method step that by using a second die button (90) having a central post (92) and a concavely rounded ring surface (94) surrounding the central post the end region (15) of the rivet section (18) remote from the flange are projecting out of the components is beaded over or calibrated into a rivet bead (80; 120) with the central post (92) of the die button (90) being preferably of divergent shape in the direction away from the flange (12).

* * * * *